United States Patent
Kwon et al.

(10) Patent No.: US 10,723,949 B2
(45) Date of Patent: Jul. 28, 2020

(54) LIQUID CRYSTAL COMPOSITION AND DISPLAY DEVICE INCLUDING THE SAME

(71) Applicant: Samsung Display Co., Ltd., Yongin-si (KR)

(72) Inventors: Sun Young Kwon, Seoul (KR); Min-Hee Kim, Ansan-si (KR); Ji Eun Jang, Suwon-si (KR); Il Joon Kang, Hwaseong-si (KR); Jong Ho Son, Seoul (KR); Keun Chan Oh, Hwaseong-si (KR); Chang-Hun Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/166,162

(22) Filed: Oct. 22, 2018

(65) Prior Publication Data
US 2019/0119572 A1    Apr. 25, 2019

(30) Foreign Application Priority Data
Oct. 25, 2017    (KR) .......................... 10-2017-0139595

(51) Int. Cl.
    *G02F 1/1333*    (2006.01)
    *C09K 19/30*    (2006.01)
    *C09K 19/56*    (2006.01)
    *G02F 1/1337*    (2006.01)
    *C09K 19/04*    (2006.01)

(52) U.S. Cl.
    CPC .......... *C09K 19/3003* (2013.01); *C09K 19/56* (2013.01); *G02F 1/133788* (2013.01); *C09K 2019/0448* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2019/3027* (2013.01); *G02F 2001/133742* (2013.01); *G02F 2202/023* (2013.01)

(58) Field of Classification Search
    CPC ................ C09K 19/3003; C09K 19/56; C09K 2019/0448; C09K 2019/0466; C09K 2019/3004; C09K 2019/3009; C09K 2019/301; C09K 2019/3016; C09K 2019/3027; G02F 1/1333; G02F 1/133788; G02F 2001/133742; G02F 2202/023
    USPC ...................................................... 252/299.66
    See application file for complete search history.

(56) References Cited

U.S. PATENT DOCUMENTS

| | | | |
|---|---|---|---|
| 9,249,355 | B2 | 2/2016 | Archetti et al. |
| 9,567,525 | B2 | 2/2017 | Hong et al. |
| 9,902,905 | B2 | 2/2018 | Kim et al. |
| 2015/0166890 | A1 | 6/2015 | Archetti et al. |
| 2015/0252265 | A1 | 6/2015 | Archetti et al. |
| 2015/0267118 | A1 | 9/2015 | Park et al. |
| 2015/0301368 | A1 | 10/2015 | Archetti et al. |
| 2019/0085242 | A1* | 3/2019 | Jang .................. C09K 19/3003 |

FOREIGN PATENT DOCUMENTS

| | | |
|---|---|---|
| KR | 10-2015-0109543 | 10/2015 |
| KR | 10-2016-0130079 | 11/2016 |
| KR | 10-2016-0147188 | 12/2016 |

* cited by examiner

*Primary Examiner* — Geraldina Visconti
(74) *Attorney, Agent, or Firm* — H.C. Park & Associates, PLC

(57) ABSTRACT

Disclosed is a liquid crystal composition including at least one compound selected from the group consisting of a liquid crystal compound expressed by Formula 1-1 and a liquid crystal compound expressed by Formula 1-2; at least one compound selected from the group consisting of a self-alignment compound expressed by Formula 2-1 and a self-alignment compound expressed by Formula 2-2; and at least one compound selected from the group consisting of a reactive mesogen expressed by Formula 3-1, a reactive mesogen expressed by Formula 3-2, a reactive mesogen expressed by Formula 3-3, a reactive mesogen expressed by Formula 3-4, and a reactive mesogen expressed by Formula 3-5. The liquid crystal composition also has negative dielectric anisotropy.

18 Claims, 6 Drawing Sheets

LIQUID CRYSTAL COMPOSITION AND DISPLAY DEVICE INCLUDING THE SAME

CROSS-REFERENCE TO RELATED APPLICATION

This application claims priority from and the benefit of Korean Patent Application No. 10-2017-0139595, filed on Oct. 25, 2017, which is hereby incorporated by reference for all purposes as if fully set forth herein.

BACKGROUND

Field

Exemplary embodiments of the invention relate generally to a liquid crystal composition and a display device including the same.

Discussion of the Background

A liquid crystal display is one of many generally used display devices. The liquid crystal display generally includes two display panels on which field generating electrodes are disposed. The liquid crystal display also includes a liquid crystal layer provided between field generating electrodes disposed on the two display panels. The liquid crystal display applies a voltage to the field generating electrodes to generate an electric field to the liquid crystal layer, thereby determining alignment of the liquid crystal molecules and controlling transmittance of light passing through the liquid crystal layer.

Regarding the liquid crystal display, a liquid crystal composition is very important in controlling transmittance of light and obtaining desired images. As the usage of the liquid crystal display has been diversified, various characteristics such as low-voltage driving, a high voltage holding ratio (VHR), a wide viewing angle characteristic, a wide operational temperature range, a high-speed response property, and prevention of generation of stains are required.

The above information disclosed in this Background section is only for understanding of the background of the inventive concepts, and, therefore, it may contain information that does not constitute prior art.

SUMMARY

Compositions according to exemplary embodiments of the invention are capable of reducing drip stains in a liquid crystal layer that are typically generated in the during the manufacturing of a liquid crystal display device. Display devices constructed according to the exemplary embodiments are capable of simplifying manufacturing by excluding an additional alignment layer.

Additional features of the inventive concepts will be set forth in the description which follows, and in part will be apparent from the description, or may be learned by practice of the inventive concepts.

An exemplary embodiment of the present invention provides a liquid crystal composition including: at least one compound selected from the group consisting of a liquid crystal compound expressed by Formula 1-1 and a liquid crystal compound expressed by Formula 1-2; at least one compound selected from the group consisting of a self-alignment compound expressed by Formula 2-1 and a self-alignment compound expressed by Formula 2-2; and at least one compound selected from the group consisting of a reactive mesogen expressed by Formula 3-1, a reactive mesogen expressed by Formula 3-2, a reactive mesogen expressed by Formula 3-3, a reactive mesogen expressed by Formula 3-4, a reactive mesogen expressed by Formula 3-5, wherein the liquid crystal composition has negative dielectric anisotropy:

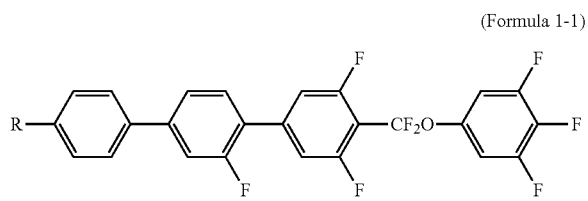

(Formula 1-1)

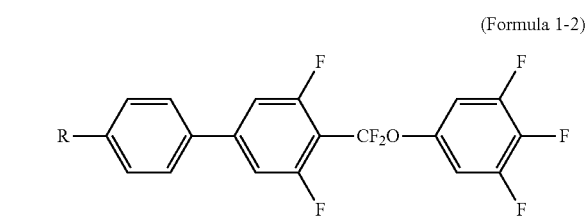

(Formula 1-2)

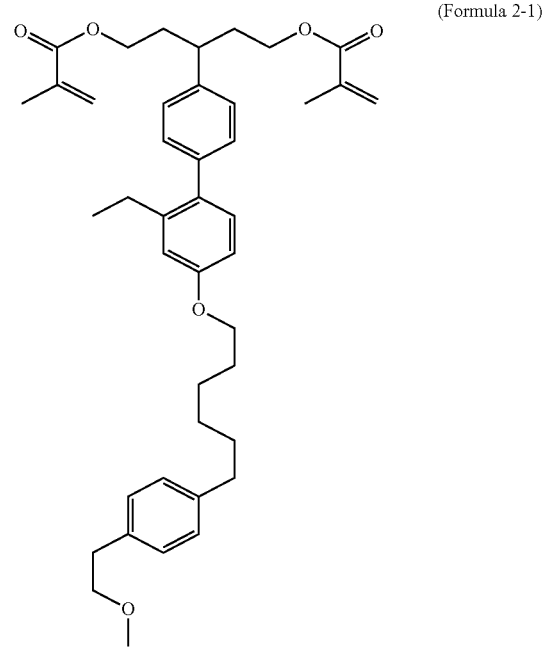

(Formula 2-1)

(Formula 2-2)

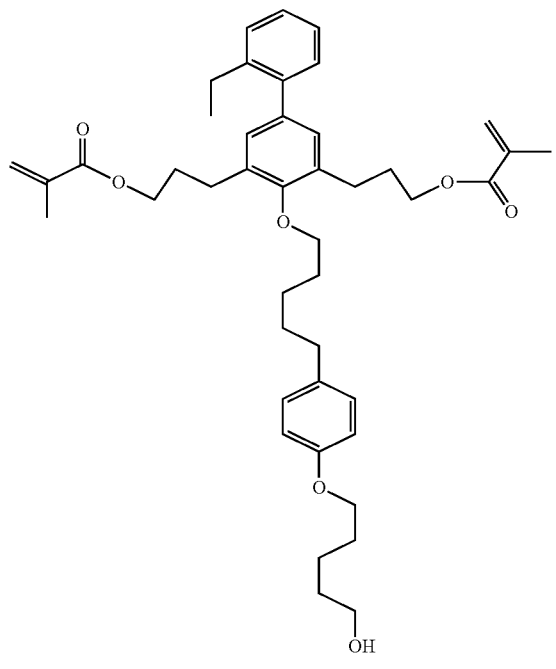

(Formula 3-1)

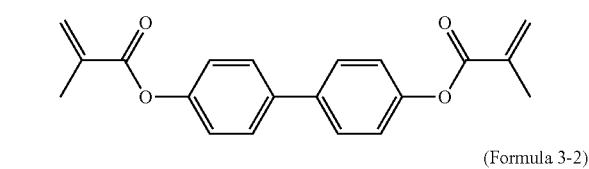

(Formula 3-2)

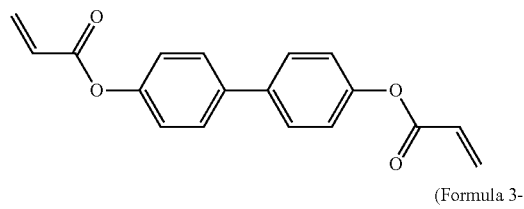

(Formula 3-3)

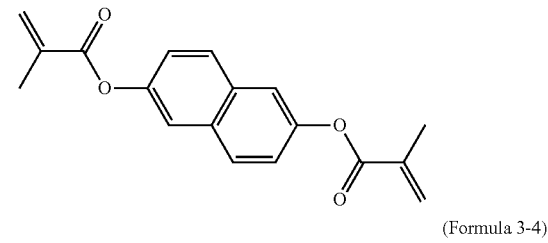

(Formula 3-4)

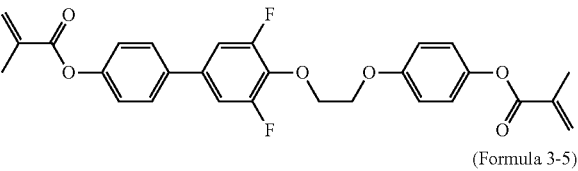

(Formula 3-5)

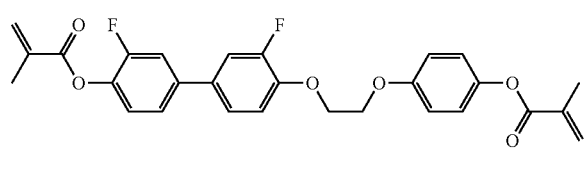

In Formula 1-1 and Formula 1-2, R is a C1 to C8 alkyl group, an alkenyl group, or an alkoxy group.

A content of the liquid crystal compound expressed by Formula 1-1 may be 0.5 wt % to 3 wt % of the entire liquid crystal composition, and a content of the liquid crystal compound expressed by Formula 1-2 may be 0.5 wt % to 3 wt % of the liquid crystal composition.

The liquid crystal composition may further include a liquid crystal compound expressed by Formula 1-3, and a content of the liquid crystal compound expressed by Formula 1-3 may be greater than 0 wt % and equal to or less than 10 wt % of the liquid crystal composition.

(Formula 1-3)

Here, R and R' are independently a C1 to C8 alkyl group, an alkenyl group, or an alkoxy group.

A content of at least one of the self-alignment compound expressed by Formula 2-1 and the self-alignment compound expressed by Formula 2-2 may be 0.05 wt % to 3 wt % of the liquid crystal composition.

A content of at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 may be 0.05 wt % to 3 wt % of the liquid crystal composition.

Refractive anisotropy of the liquid crystal composition may be 0.08 to 0.13, rotation viscosity may be 70 to 150, and dielectric anisotropy may be −2.8 to −5.5.

The liquid crystal composition may include the self-alignment compound expressed by Formula 2-2. In addition, an absolute value of average interaction energy between one of the liquid crystal compound expressed by Formula 1-1 and the liquid crystal compound expressed by Formula 1-2 and the self-alignment compound expressed by Formula 2-1 and the self-alignment compound expressed by Formula 2-2 may be greater than an absolute value of average interaction energy between the liquid crystal compound expressed by Formula 1-3 and the self-alignment compound expressed by Formula 2-1.

The liquid crystal composition may further include at least one compound selected from the group consisting of a compound expressed by Formula 1-4, a compound expressed by Formula 1-5, a compound expressed by Formula 1-6, a compound expressed by Formula 1-7, and a compound expressed by Formula 1-8.

(Formula 1-4)

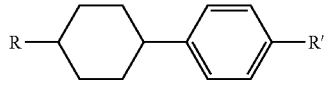

(Formula 1-5)

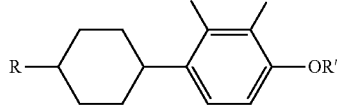

(Formula 1-6)

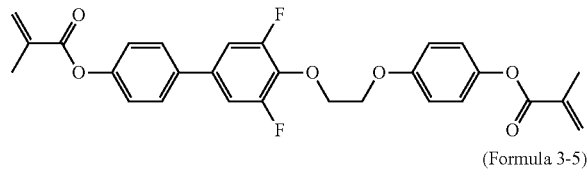

-continued

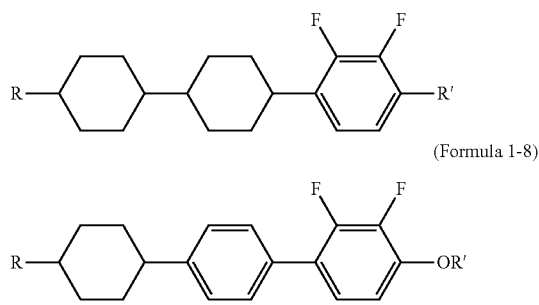

Here, R and R' are independently a C1 to C8 alkyl group, an alkenyl group, or an alkoxy group.

Another embodiment of the present invention provides a display device including: a first substrate; a second substrate facing the first substrate and overlapping the first substrate; and a liquid crystal layer disposed between the first substrate and the second substrate, wherein the liquid crystal layer includes at least one compound selected from the group consisting of a liquid crystal compound expressed by Formula 1-1, a liquid crystal compound expressed by Formula 1-2, and a liquid crystal compound expressed by Formula 1-3, at least one compound selected from the group consisting a self-alignment compound expressed by Formula 2-1 and a self-alignment compound expressed by Formula 2-2, and at least one compound selected from the group consisting of a reactive mesogen expressed by Formula 3-1, a reactive mesogen expressed by Formula 3-2, a reactive mesogen expressed by Formula 3-3, a reactive mesogen expressed by Formula 3-4, and a reactive mesogen expressed by Formula 3-5, and an absolute value of average interaction energy between one of the liquid crystal compound expressed by Formula 1-1 and the liquid crystal compound expressed by Formula 1-2 and both the self-alignment compound expressed by Formula 2-1 and the self-alignment compound expressed by Formula 2-2 is greater than an absolute value of average interaction energy between the liquid crystal compound expressed by Formula 1-3 and the self-alignment compound expressed by Formula 2-1 and the self-alignment compound expressed by Formula 2-2.

A content of the liquid crystal compound expressed by Formula 1-1 may be 0.5 wt % to 3 wt % of the liquid crystal composition, a content of the liquid crystal compound expressed by Formula 1-2 may be 0.5 wt % to 3 wt % of the liquid crystal composition, and a content of the liquid crystal compound expressed by Formula 1-3 may be greater than 0 wt % and equal to or less than 10 wt % of the liquid crystal composition.

A content of the at least one of the self-alignment compound expressed by Formula 2-1 and the self-alignment compound expressed by Formula 2-2 may be 0.05 wt % to 3 wt % of the liquid crystal composition.

A content of at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 may be 0.05 wt % to 3 wt % of the liquid crystal composition.

A content of at least one of the self-alignment compound expressed by Formula 2-1 and the self-alignment compound expressed by Formula 2-2 may be greater than a content of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5.

The refractive anisotropy of the liquid crystal composition may be 0.08 to 0.13, rotation viscosity is 70 to 150, and dielectric anisotropy is −2.8 to −5.5.

The liquid crystal composition may further include at least one compound selected from the group consisting of a compound expressed by Formula 1-4, a compound expressed by Formula 1-5, a compound expressed by Formula 1-6, a compound expressed by Formula 1-7, and a compound expressed by Formula 1-8:

(Formula 1-4)

(Formula 1-5)

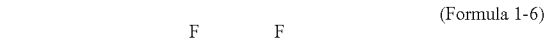
(Formula 1-6)

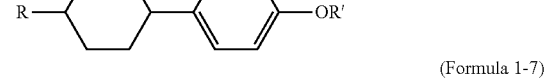
(Formula 1-7)

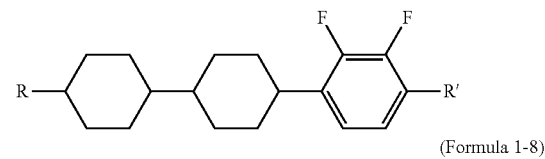
(Formula 1-8)

and

R and R' may be independently a C1 to C8 alkyl group, an alkenyl group, or an alkoxy group.

At least one of the self-alignment compound expressed by Formula 2-1 and the self-alignment compound expressed by Formula 2-2 may be disposed between the first substrate and the liquid crystal layer and between the second substrate and the liquid crystal layer, and at least one of the self-alignment compound expressed by Formula 2-1 and the self-alignment compound expressed by Formula 2-2 may vertically align a plurality of liquid crystal molecules of the liquid crystal layer.

At least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 may be disposed between the first substrate and the liquid crystal layer and between the second substrate and the liquid crystal layer, and at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 may arrange a plurality of liquid crystal molecules of the liquid crystal layer to be inclined with respect to a direction that is perpendicular to the first substrate.

The display device may not include an alignment layer disposed between the first substrate and the liquid crystal layer and between the second substrate and the liquid crystal layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
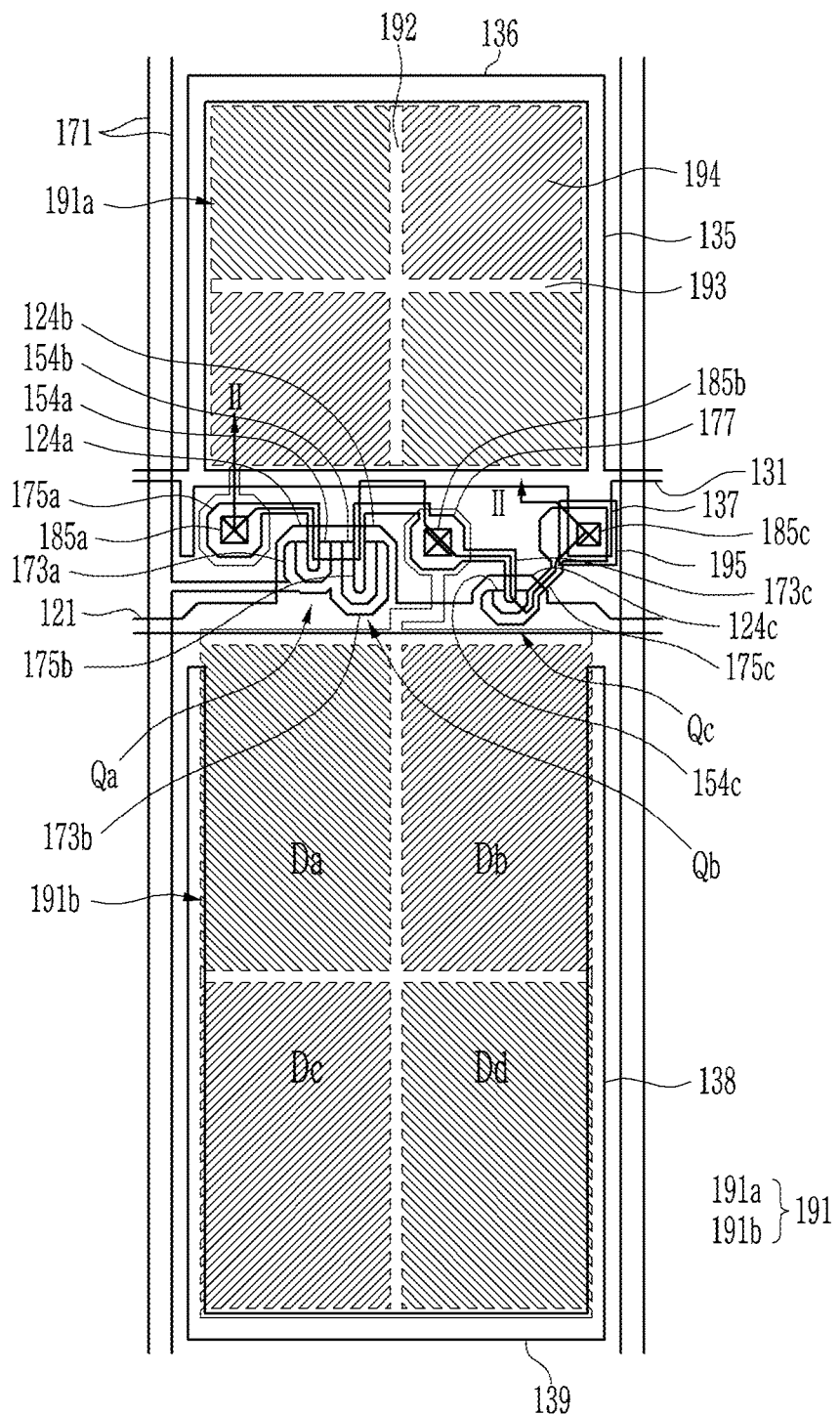
FIG. 1 shows a top plan view of a pixel according to an exemplary embodiment of the present invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z," "at least one selected from the group consisting of X, Y, and Z," and "at least one element selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 2:
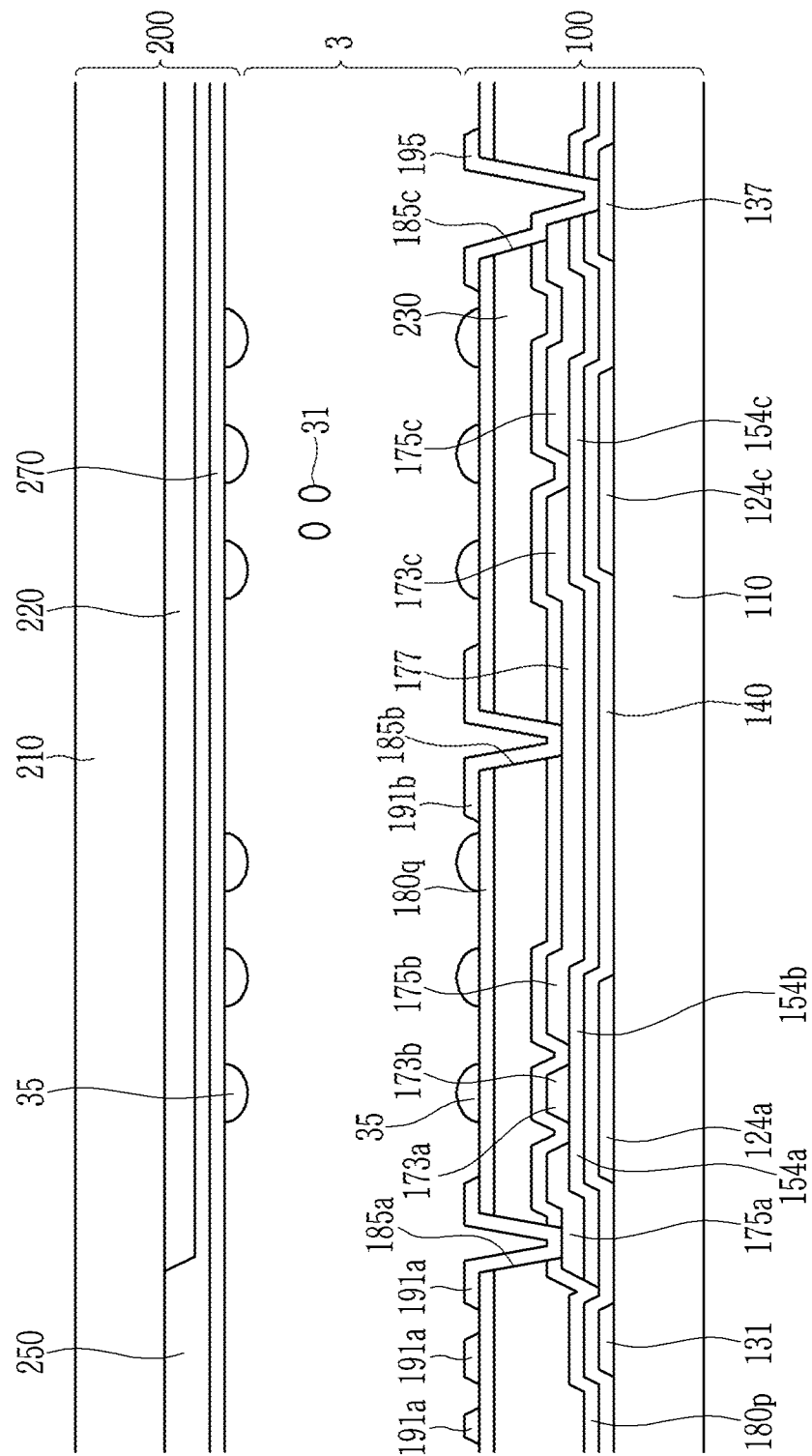
FIG. 2 shows a cross-sectional view with respect to a line II-II of FIG. 1.

A liquid crystal composition and a display device including the same according to an exemplary embodiment of the present invention will now be described with reference to FIG. 1 and FIG. 2. FIG. 1 shows a top plan view of a pixel according to an exemplary embodiment. FIG. 2 shows a cross-sectional view with respect to a line II-II of FIG. 1.

A liquid crystal composition according to an exemplary embodiment will now be described.

A liquid crystal composition according to an exemplary embodiment may include at least one compound selected from the group consisting of a liquid crystal compound expressed in Formula 1-1 and a liquid crystal compound expressed in Formula 1-2, at least one compound selected from the group consisting of a self-alignment compound expressed in Formula 2-1 and a self-alignment compound expressed in Formula 2-2, and at least one compound selected from the group consisting of a reactive mesogen expressed in Formula 3-1, a reactive mesogen expressed in Formula 3-2, a reactive mesogen expressed in Formula 3-3, a reactive mesogen expressed in Formula 3-4, and a reactive mesogen expressed in Formula 3-5.

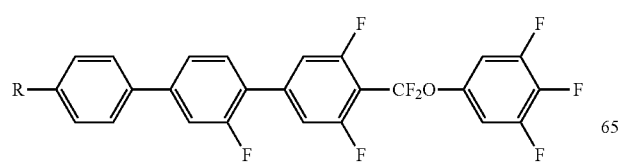

(Formula 1-1)

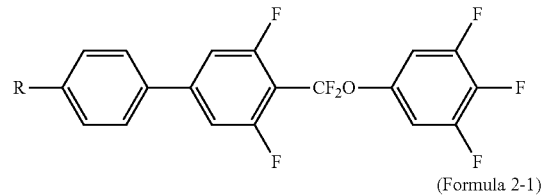

(Formula 1-2)

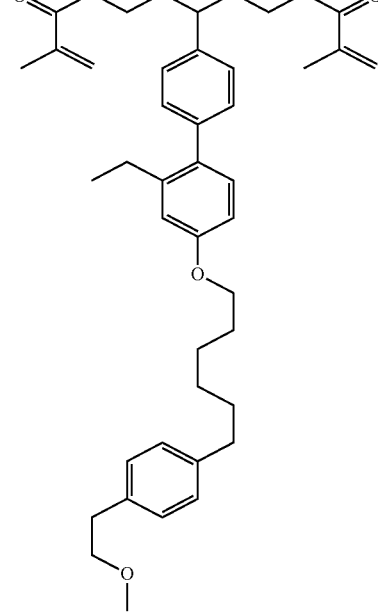

(Formula 2-1)

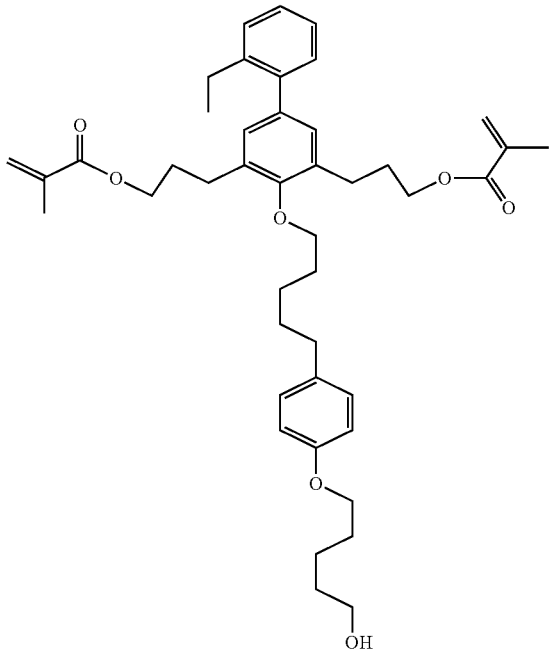

(Formula 2-2)

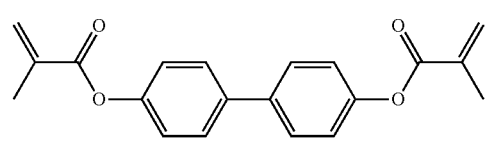

(Formula 3-1)

-continued (Formula 3-2)

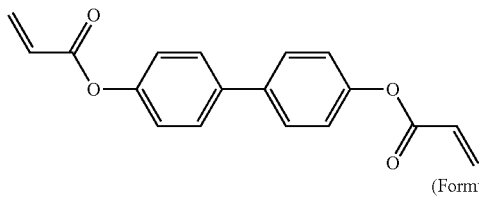

(Formula 3-3)

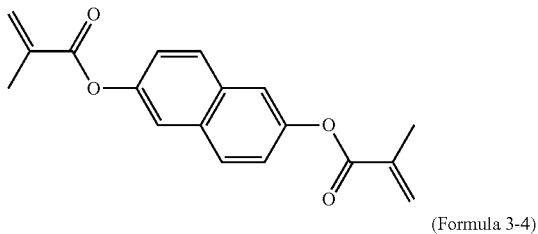

(Formula 3-4)

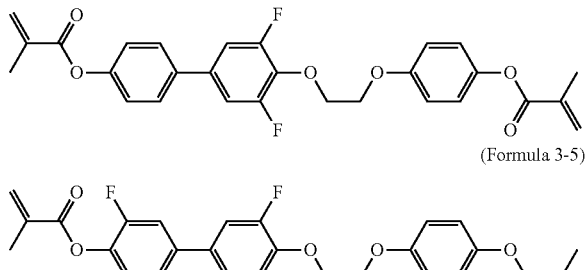

(Formula 3-5)

Regarding Formula 1-1 and 1-2, R is independently a C1 to C8 alkyl group, an alkenyl group, or an alkoxy group. For example, R may be a C1 to C4 alkyl group, and hydrogen atoms may be substituted with other atoms.

The liquid crystal composition may further include a liquid crystal compound expressed in Formula 1-3.

(Formula 1-3)

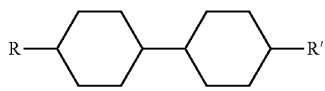

Regarding Formula 1-3, R and R' are independently a C1 to C8 alkyl group, an alkenyl group, or an alkoxy group. For example, R may be a C1 to C4 alkyl group, and hydrogen atoms may be substituted with other atoms.

A content of the liquid crystal compound expressed in Formula 1-1 may be about 0.5 wt % to 3 wt % of the entire liquid crystal composition, and a content of the liquid crystal compound expressed in Formula 1-2 may be about 0.5 wt % to 3 wt % of the entire liquid crystal composition. A content of the liquid crystal compound expressed in Formula 1-3 may be greater than 0 and equal to or less than about 10 wt % of the entire liquid crystal composition.

The liquid crystal composition may have negative dielectric anisotropy. In detail, the dielectric anisotropy of the liquid crystal composition may be −2.8 to −5.5, refractive anisotropy may be 0.08 to 0.13, and rotation viscosity may be 70 to 150. The liquid crystal composition may satisfy the property of matters described with reference to the range of the content.

The self-alignment compound expressed in Formula 2-1, the self-alignment compound expressed in Formula 2-2, or both may vertically align liquid crystal molecules on a first substrate or a second substrate without an additional alignment layer. A content of at least one of the self-alignment compound expressed in Formula 2-1, the self-alignment compound expressed in Formula 2-2 may be 0.05 wt % to 3 wt % of the entire liquid crystal composition. The self-alignment compounds (i.e., Formula 2-1 and Formula 2-2) may be used to vertically align the liquid crystal molecules of the liquid crystal layer.

The reactive mesogen, whether it be Formula 3-1, Formula 3-2, Formula 3-3, Formula 3-4, Formula 3-5, or some combination thereof, may align the liquid crystal molecule in an inclined manner with respect to a direction that is perpendicular to the first substrate or the second substrate. A content of at least one of the reactive mesogen expressed in Formula 3-1, a reactive mesogen expressed in Formula 3-2, a reactive mesogen expressed in Formula 3-3, a reactive mesogen expressed in Formula 3-4, and a reactive mesogen expressed in Formula 3-5 may be 0.05 wt % to 3 wt % of the entire liquid crystal composition.

A content of the self-alignment compound or self-alignment compounds (i.e., Formula 2-1, Formula 2-2, or both) included in the liquid crystal composition may be greater than the content of the reactive mesogen or reactive mesogens (i.e., Formula 3-1, Formula 3-2, Formula 3-3, Formula 3-4, Formula 3-5, or some combination thereof). For example, about 0.8 wt % of at least one of the self-alignment compound expressed in Formula 2-1 and the self-alignment compound expressed in Formula 2-2 may be included therein, and about 0.3 wt % of at least one of the reactive mesogen expressed in Formula 3-1, a reactive mesogen expressed in Formula 3-2, a reactive mesogen expressed in Formula 3-3, a reactive mesogen expressed in Formula 3-4, and a reactive mesogen expressed in Formula 3-5 may be included therein.

Interaction energy to be described represents an energy value calculated in consideration of a π-π interaction between benzene rings included by the liquid crystal compound and the self-alignment compound. Average interaction energy may be expressed as in Equation 1.

$$\text{Average interaction energy} = (E_{2\text{-}1}*0.2 + E_{2\text{-}2}*0.6)/0.8 \quad \text{(Equation 1)}$$

Here, $E_{2\text{-}1}$ is interaction energy between one liquid crystal compound and the self-alignment compound expressed by Formula 2-1, and $E_{2\text{-}2}$ is interaction energy between one liquid crystal compound and the self-alignment compound expressed by Formula 2-2.

An absolute value of the average interaction energy between one of the liquid crystal compound expressed in Formula 1-1 and the liquid crystal compound expressed in Formula 1-2 and at least one of a self-alignment compound expressed by Formula 2-1 and a self-alignment compound expressed by Formula 2-2 may be different from an absolute value of the average interaction energy between the liquid crystal compound expressed in Formula 1-3 and the self-alignment compound expressed by Formula 2-1 and a self-alignment compound expressed by Formula 2-2. For example, an absolute value of the average interaction energy between one of the liquid crystal compound expressed by Formula 1-1 and the liquid crystal compound expressed by Formula 1-2 and at least one of the self-alignment compound expressed by Formula 2-1 and a self-alignment compound expressed by Formula 2-2 may be greater than an absolute value of the average interaction energy between the liquid crystal compound expressed by Formula 1-3 and the one self-alignment compound.

The liquid crystal composition according to an exemplary embodiment may be dripped on one substrate in a process of combining a first substrate and a second substrate. The dripped liquid crystal composition must be uniformly spread on the one substrate.

As described above, the liquid crystal compound expressed by Formula 1-3 may have a weak combination force with at least one of the self-alignment compound expressed by Formula 2-1 and a self-alignment compound expressed by Formula 2-2. Alternatively, at least one of the self-alignment compound expressed by Formula 2-1 and a self-alignment compound expressed by Formula 2-2 may have strong adsorption to the substrate, and it may be adsorbed to the substrate when dripped on the substrate. At least one of the self-alignment compound expressed by Formula 2-1 and a self-alignment compound expressed by Formula 2-2 may not be uniformly spread on the substrate but may be condensed thereon. When at least one of the self-alignment compound expressed by Formula 2-1 and a self-alignment compound expressed by Formula 2-2 is not uniformly spread on the substrate and the at least one of the self-alignment compound expressed by Formula 2-1 and a self-alignment compound expressed by Formula 2-2 has a low spreading property, a region in which the liquid crystal composition is dripped may be stained.

An absolute value of the interaction energy of one of the liquid crystal compound expressed by Formula 1-1 and the liquid crystal compound expressed by Formula 1-2 and one self-alignment compound (i.e., Formula 2-1 or Formula 2-2) may be relatively large. The one self-alignment compound may not be adsorbed to the substrate but may be combined to the liquid crystal compound expressed by Formula 1-1 and the liquid crystal compound expressed by Formula 1-2. The one self-alignment compound mixed with the liquid crystal composition including the liquid crystal compounds expressed by Formula 1-1 and Formula 1-2 may not be adsorbed to the substrate but may be uniformly spread on the substrate during the process of dripping the liquid crystal composition. The liquid crystal composition including a predetermined content of the liquid crystal compounds expressed by Formula 1-1 and Formula 1-2 may prevent stains according to the adsorption of the one self-alignment compound to the substrate.

The liquid crystal composition does not include an additional alignment layer through the self-alignment compound, and it may be uniformly disposed on the substrate while it includes the self-alignment compound.

The liquid crystal composition may include at least one of a compound expressed in Formula 1-4, a compound expressed in Formula 1-5, a compound expressed in Formula 1-6, a compound expressed in Formula 1-7, and a compound expressed in Formula 1-8, but it is not limited thereto.

(Formula 1-4)

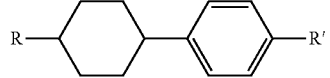

(Formula 1-5)

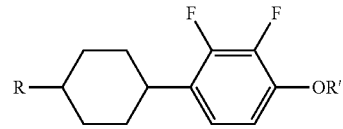

(Formula 1-6)

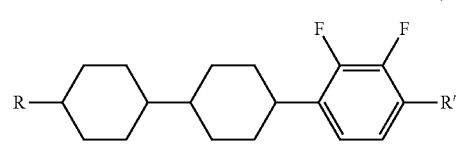

(Formula 1-7)

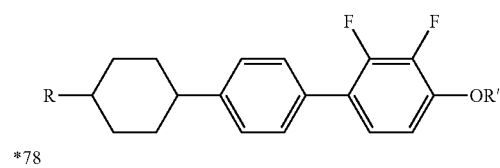

(Formula 1-8)

*78

Regarding Formula 1-4 to Formula 1-8, R and R' are independently C1 to C8 alkyl group, an alkenyl group, or an alkoxy group. For example, R and R' may be a C1 to C4 alkyl group, and hydrogen atoms may be substituted with other atoms.

A display device including the above-described liquid crystal composition will now be described with reference to FIG. 1 and FIG. 2. A lower panel 100 will now be described.

A gate conductor including a gate line 121 and a reference voltage line 131 is disposed on a first substrate 110.

The gate line 121 includes a first gate electrode 124a, a second gate electrode 124b, and a third gate electrode 124c. The reference voltage line 131 includes first storage electrodes 135 and 136 and a reference electrode 137. Although not connected to the reference voltage line 131, second storage electrodes 138 and 139 may be provided to overlap a second sub-pixel electrode 191b.

A gate insulating layer 140 may be disposed on the gate line 121 and the reference voltage line 131.

A first semiconductor layer 154a, a second semiconductor layer 154b, and a third semiconductor layer 154c may be disposed on the gate insulating layer 140. Although not shown in the present specification, ohmic contact members disposed on the first, second, and third semiconductor layers 154a, 154b, and 154c may be included according to an exemplary embodiment.

A data conductor including a data line 171 connected to a first source electrode 173a and a second source electrode 173b, a first drain electrode 175a, a second drain electrode 175b, a third source electrode 173c, and a third drain electrode 175c may be disposed on the gate insulating layer 140 and the semiconductor layers 154a, 154b, and 154c.

The first gate electrode 124a, the first source electrode 173a, and the first drain electrode 175a form a first thin film transistor Qa together with the first semiconductor layer 154a. The second gate electrode 124b, the second source electrode 173b, and the second drain electrode 175b form a second thin film transistor Qb together with the second semiconductor layer 154b. The third gate electrode 124c, the third source electrode 173c, and the third drain electrode 175c form a third thin film transistor Qc together with the third semiconductor layer 154c.

The second drain electrode 175b may be connected to the third source electrode 173c. The second drain electrode 175b may include an extension 177 that has a portion wider than a portion of the second drain electrode 175b that is not part of the extension 177.

A first passivation layer 180q may be disposed on the data conductors 171, 173a, 173b, 173c, 175a, 175b, 175c, and 177 and the semiconductor layers 154a, 154b, and 154c. The first passivation layer 180p may include an inorganic insulating layer or an organic insulator such as a silicon nitride or a silicon oxide.

A color filter 230 may be disposed on the first passivation layer 180p. The color filter 230 may extend in a vertical direction along two data lines 171 that are adjacent to each other. An exemplary embodiment describes and shows that the color filter 230 may be disposed on the lower panel 100, but the color filter 230 may be disposed on an upper panel 200 and not the lower panel 100 depending on the exemplary embodiment.

A second passivation layer 180q may be disposed on the color filter 230. The second passivation layer 180q may include an inorganic insulating layer or an organic insulator such as a silicon nitride or a silicon oxide in a like manner of the first passivation layer 180p.

The second passivation layer 180q may prevent the color filter 230 from being lifted and controls contamination of a liquid crystal layer 3 caused by an organic material such as a solvent input by the color filter 230, thereby preventing a defect such as an afterimage that may be generated when a screen is driven.

The first passivation layer 180p, the color filter 230, and the second passivation layer 180q may have a first contact hole 185a and a second contact hole 185b. The first drain electrode 175a and the second drain electrode 175b may be electrically connected to the first sub-pixel electrode 191a and the second sub-pixel electrode 191b through the first contact hole 185a and the second contact hole 185b, respectively.

The first passivation layer 180p, the color filter 230, the second passivation layer 180q, and the gate insulating layer 140 may have a third contact hole 185c, and a connecting member 195 is provided in the third contact hole 185c. The connecting member 195 may electrically connect the reference electrode 137 and the third drain electrode 175c.

A pixel electrode 191 may be disposed on the second passivation layer 180q. The pixel electrode 191 and the common electrode 270 (described below) are field generating electrodes. The pixel electrode 191 may include a first sub-pixel electrode 191a and a second sub-pixel electrode 191b that are separated from each other with a gate line 121 therebetween and neighboring each other in a column direction with respect to the gate line 121.

The pixel electrode 191 may be made of a transparent material such as an ITO and an IZO.

The first sub-pixel electrode 191a and the second sub-pixel electrode 191b may be quadrangular. The first sub-pixel electrode 191a and the second sub-pixel electrode 191b may respectively include a cross-shaped stem including a horizontal stem 193 and a vertical stem 192 crossing the same. Further, the first sub-pixel electrode 191a and the second sub-pixel electrode 191b may be respectively divided into a first sub-region (Da), a second sub-region (Db), a third sub-region (Dc), and a fourth sub-region (Dd) by the horizontal stem 193 and the vertical stem 192, and they may include a plurality of fine branches 194 provided in the sub-regions (Da through Dd).

The first sub-pixel electrode 191a and the second sub-pixel electrode 191b may receive a data voltage from the first drain electrode 175a and the second drain electrode 175b, respectively. In this instance, a portion of the data voltage applied to the second drain electrode 175b may be divided through the third source electrode 173c, so the voltage applied to the first sub-pixel electrode 191a becomes larger than the voltage applied to the second sub-pixel electrode 191b.

The first sub-pixel electrode 191a and the second sub-pixel electrode 191b, to both of which the data voltage may be applied, may generate an electric field together with a common electrode 270 of the upper panel 200 to determine the direction of liquid crystal molecules 31 of the liquid crystal layer 3 between the electrodes 191 and 270. As described, luminance of light passing through the liquid crystal layer 3 may be changeable according to the direction of the liquid crystal molecules 31.

The thin film transistor and the pixel electrode 191 have been described as an example, and a structure of the thin film transistor and a design of the pixel electrode may be modified so as to improve lateral visibility.

The upper panel 200 including a second substrate 210 will now be described. The second substrate 210 overlaps the first substrate 110 with a gap therebetween. The liquid crystal layer 3 is provided between the first substrate 110 and the second substrate 210.

A light blocking member 220 and an overcoat 250 may be sequentially disposed between the second substrate 210 and the liquid crystal layer 3. The overcoat 250 may be omitted depending on exemplary embodiments.

The light blocking member 220 may include a pigment such as carbon black, and it may include an organic material with photosensitivity. The present specification describes and shows an exemplary embodiment in which the light blocking member is disposed on the upper panel 200, and without being limited to this, it may be disposed on the lower panel 100.

The common electrode 270 that is a field generating electrode that may be disposed between the overcoat 250 and the liquid crystal layer 3. The common electrode 270 may generate an electric field together with the pixel electrode 191 of the lower panel 100 to determine the direction of the liquid crystal molecules 31 of the liquid crystal layer 3.

The liquid crystal layer 3 including a plurality of liquid crystal molecules 31 may be disposed between the lower panel 100 and the upper panel 200. The liquid crystal layer 3 may have negative dielectric anisotropy, and it may include a liquid crystal composition according to the above-described exemplary embodiment.

The self-alignment compound and the reactive mesogen included in the liquid crystal composition may be disposed between the liquid crystal layer 3 and the first substrate 110 and between the liquid crystal layer 3 and the second substrate 210 as protrusions 35.

The protrusions 35 may include at least one of a reactive mesogen polymer formed by irradiation of light to the liquid crystal composition, a self-alignment compound polymer, a reactive mesogen expressed in Formula 3-1, a reactive mesogen expressed in Formula 3-2, a reactive mesogen expressed in Formula 3-3, a reactive mesogen expressed in Formula 3-4, and a reactive mesogen expressed in Formula 3-5, a self-alignment compound expressed in Formula 2-1, and a self-alignment compound expressed in Formula 2-2.

The self-alignment compound or compounds (whether it be the self-alignment compound expressed in Formula 2-1, the self-alignment compound expressed in Formula 2-2, or both) may align the liquid crystal molecules 31 so that they may be perpendicular to the first substrate 110 or the second substrate 210. The display device according to an exemplary embodiment does not include an alignment layer. Through the self-alignment compound or compounds, a plurality of liquid crystal molecules 31 may be aligned without the alignment layer to be perpendicular to the substrate.

The reactive mesogen or reactive mesogens (whether it be a reactive mesogen expressed in Formula 3-1, a reactive mesogen expressed in Formula 3-2, a reactive mesogen expressed in Formula 3-3, a reactive mesogen expressed in Formula 3-4, a reactive mesogen expressed in Formula 3-5, or some combination thereof) may be included in the liquid crystal layer 3, or may be disposed on the pixel electrode 191 or the common electrode 270 in a form of a polymer cured by a polymerization reaction by rays such as ultraviolet rays. The reactive mesogen or reactive mesogens may arrange a plurality of liquid crystal molecules 31 included in the liquid crystal layer 3 to be inclined from the direction that is perpendicular to the first substrate 110 or the second substrate 210.

Accordingly, the above-described display device does not include an additional alignment layer but includes a self-alignment compound, thereby simplifying the manufacturing process. Further, the above-described liquid crystal composition may help the self-alignment compound to be uniformly spread, so it may reduce the dripped stains generated to the display device.

Figure 3:
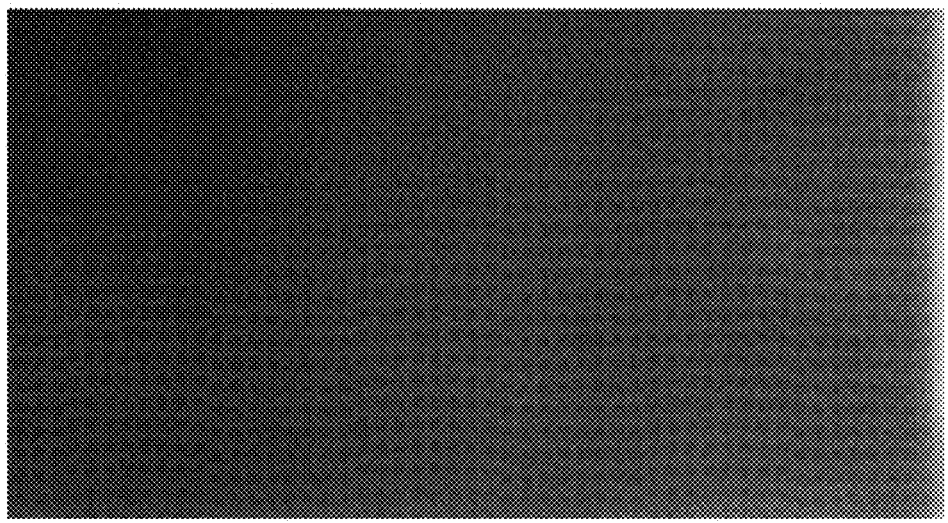
FIG. 3 shows an image of stains generated in a process of dripping a liquid crystal composition.
Figure 4:
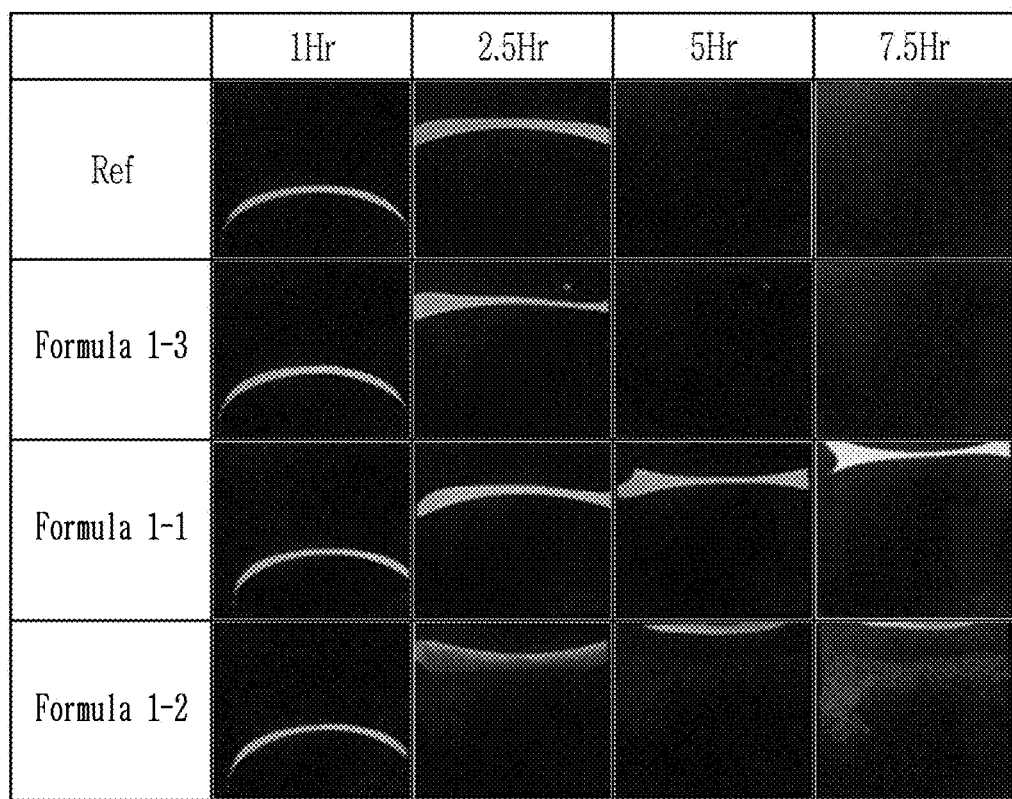
FIG. 4 shows an image according to an adsorption degree of a liquid crystal compound and a self-alignment compound.
Figure 5:
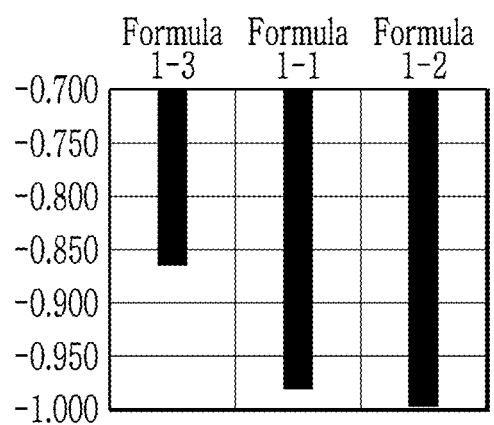
FIG. 5 shows a graph of adsorption energy between a liquid crystal compound and a self-alignment compound.
Figure 6:
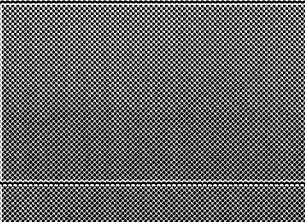
FIG. 6 shows an image of stains according to Comparative Example 1 to Comparative Example 4, Exemplary Embodiment 1, and Exemplary Embodiment 2.

Dripped stains of a liquid crystal composition according to an exemplary embodiment will now be described with reference to FIG. 3 to FIG. 6. FIG. 3 shows an image of stains generated in a process of dripping a liquid crystal composition according to a comparative example. FIG. 4 shows an image according to an adsorption degree of a liquid crystal compound and a self-alignment compound. FIG. 5 shows a graph of adsorption energy between a liquid crystal compound and a self-alignment compound. FIG. 6 shows an image of stains according to Comparative Example 1, Comparative Example 2, Comparative Example 3, Comparative Example 4, Exemplary Embodiment 1, and Exemplary Embodiment 2.

Referring to FIG. 3, during process of dripping a liquid crystal composition on a substrate, the self-alignment compound or compounds, included in the liquid crystal composition, may be quickly adsorbed to the substrate hindering the spreading of the self-alignment compound or compounds. In other words, the spreadability of the self-alignment compound or compounds may be low. Thus, the self-alignment compound or compounds may be condensed in a predetermined region of the substrate and may be seen as stains as shown in FIG. 3.

With reference to FIG. 4, the adsorption speed and spreading of the self-alignment compound with respect to time while respectively adding 5 wt % of the liquid crystal compounds expressed by Formula 1-1, Formula 1-2, and Formula 1-3 in comparison with a reference liquid crystal (Ref), are evaluated. It is found from the images shown in FIG. 4 that the self-alignment compound has spread through white band shapes.

Regarding the states of the liquid crystal compounds expressed by Formula 1-1 or Formula 1-2 when 1 hour, 2.5 hours, 5 hours, and 7.5 hours have passed, it is found that the adsorption of the self-alignment compound is not complete in comparison with the reference liquid crystal or the liquid crystal compound expressed by Formula 1-3.

It is found that the liquid crystal compound expressed by Formula 1-1 or Formula 1-2 reduces a speed of adsorption to the substrate of the self-alignment compound and improves spreading of the liquid crystal composition in comparison to the liquid crystal compound expressed by Formula 1-3.

Referring to FIG. 5 and Table 1, average interaction energy between the compound expressed by Formula 1-1 and the self-alignment compounds used is about −0.979 eV, and average interaction energy between the compound expressed by Formula 1-2 and the self-alignment compounds used is about −0.996 eV. It is found that average interaction energy between the compound expressed by Formula 1-3 and the self-alignment compounds used is about −0.863 eV, which is shown in FIG. 5.

TABLE 1

|  | Interaction energy (eV) with self-alignment compound expressed by Formula 2-1 | Interaction energy (eV) with self-alignment compound expressed by Formula 2-2 | Average interaction energy (eV) |
|---|---|---|---|
| Formula 1-1 | −0.81 | −1.04 | −0.979 |
| Formula 1-2 | −0.81 | −1.06 | −0.996 |
| Formula 1-3 | −0.77 | −0.89 | −0.863 |

This shows, as described above, that the liquid crystal compound expressed by Formulas 1-1 and 1-2 may have a relatively large absolute value of interaction energy with the self-alignment compound used, and the self-alignment compound used may not be adsorbed to the substrate, so it may be combined to the liquid crystal compound expressed by either Formula 1-1 or Formula 1-2, and it may not be adsorbed to the substrate in the process of dripping the liquid crystal composition. The liquid crystal composition including a predetermined content of a liquid crystal compound expressed by Formula 1-1 or a predetermined content of a liquid crystal compound expressed by Formula 1-2 is uniformly distributed on the substrate, and generation of a stain caused by the adsorption of the self-alignment compound to the substrate may be prevented.

Images of stains according to Comparative Examples 1 to 4 and Exemplary Embodiments 1 and 2 will now be described with reference to Table 2 and FIG. 6. Comparative Example 1 to 4 and Exemplary Embodiments 1 and 2 include the liquid crystal composition expressed in Table 2, 0.2 wt % of the self-alignment compound expressed by Formula 2-1, 0.6 wt % of the self-alignment compound expressed by Formula 2-2, and 0.3 wt % of the reactive mesogen.

TABLE 2

|  | Comparative Example 1 (wt %) | Comparative Example 2 (wt %) | Comparative Example 3 (wt %) | Comparative Example 4 (wt %) | Exemplary Embodiment 1 (wt %) | Exemplary Embodiment 2 (wt %) |
|---|---|---|---|---|---|---|
| Formula 1-3 | 10 | 18.2 | 9.4 | 9.4 | 9.7 | 9.7 |
| Formula 1-4 | 10 | 9.0 | 9.4 | 9.4 | 9.7 | 9.7 |
| Formula 1-5 | 20 | 18.2 | 19.0 | 19.0 | 19.4 | 19.4 |

TABLE 2-continued

|  | Comparative Example 1 (wt %) | Comparative Example 2 (wt %) | Comparative Example 3 (wt %) | Comparative Example 4 (wt %) | Exemplary Embodiment 1 (wt %) | Exemplary Embodiment 2 (wt %) |
|---|---|---|---|---|---|---|
| Formula 1-6 | 20 | 18.2 | 19.1 | 19.1 | 19.4 | 19.4 |
| Formula 1-7 | 20 | 18.2 | 19.0 | 19.0 | 19.4 | 19.4 |
| Formula 1-8 | 20 | 18.2 | 19.1 | 19.1 | 19.4 | 19.4 |
| Formula 1-1 | 0 | 0 | 5 | 0 | 3 | 0 |
| Formula 1-2 | 0 | 0 | 0 | 5 | 0 | 3 |
| Dielectric anisotropy | −3.7 | −3.5 | −2.2 | −2.3 | −2.8 | −2.9 |

Referring to Table 2 and FIG. 6, Comparative Example 1 indicates about a level 2 by an eye view, and Comparative Example 2 indicates about a level 3 by an eye view. However, Comparative Example 3 further including the liquid crystal compound expressed by Formula 1-1 shows an eye-viewed image with about a level 1. Comparative Example 4 further including the liquid crystal compound expressed by Formula 1-2 also shows an eye-viewed image with about a level 1. Exemplary Embodiment 1 further including the liquid crystal compound expressed by Formula 1-1 and Exemplary Embodiment 2 further including the liquid crystal compound expressed by Formula 1-2 also show an eye-viewed image with about a level 1.

However, it is found that the cases of Comparative Example 3 and Comparative Example 4 include about 5 wt % of the compound expressed by Formula 1-1 or Formula 1-2 thereby failing to satisfy dielectric anisotropy required by the present invention.

When the compound expressed by Formula 1-1 or Formula 1-2 is included with a maximum of a 3 wt % level like Exemplary Embodiment 1 and Exemplary Embodiment 2, it is found that no stains caused by the self-alignment compound appear and the liquid crystal composition with predetermined dielectric anisotropy may be provided.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A liquid crystal composition, comprising:
    at least one compound selected from the group consisting of a liquid crystal compound expressed by Formula 1-1 and a liquid crystal compound expressed by Formula 1-2;
    at least one compound selected from the group consisting of a self-alignment compound expressed by Formula 2-1 and a self-alignment compound expressed by Formula 2-2; and
    at least one compound selected from the group consisting of a reactive mesogen expressed by Formula 3-1, a reactive mesogen expressed by Formula 3-2, a reactive mesogen expressed by Formula 3-3, a reactive mesogen expressed by Formula 3-4, and a reactive mesogen expressed by Formula 3-5,
    wherein the liquid crystal composition has negative dielectric anisotropy:

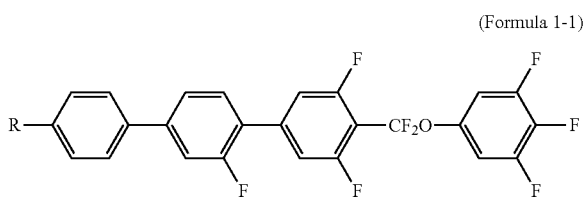

(Formula 1-1)

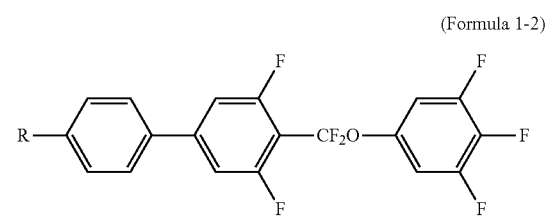

(Formula 1-2)

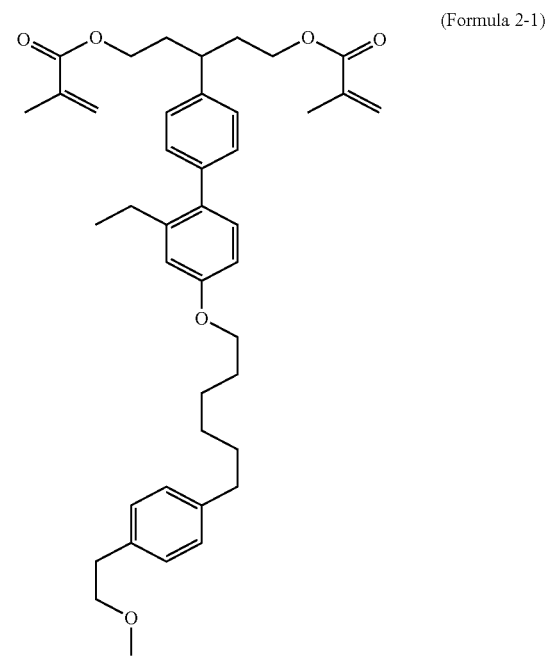

(Formula 2-1)

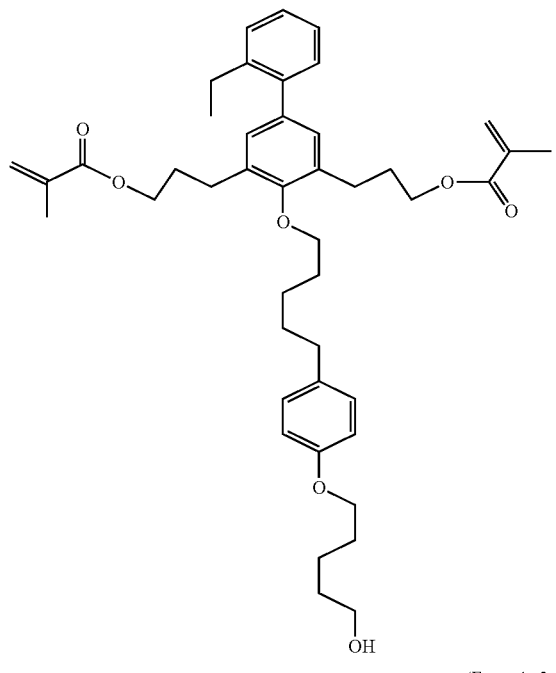
(Formula 2-2)

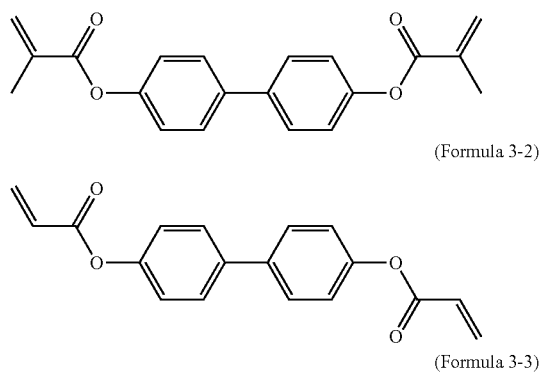
(Formula 3-1)

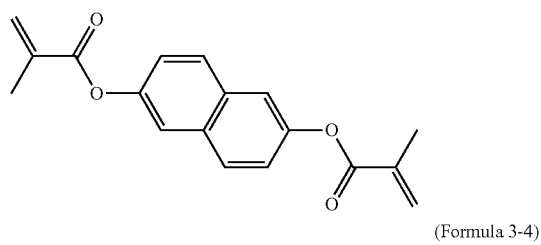
(Formula 3-2)

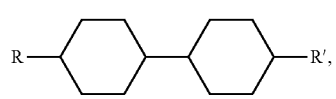
(Formula 3-3)

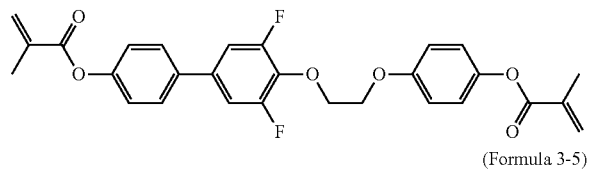
(Formula 3-4)

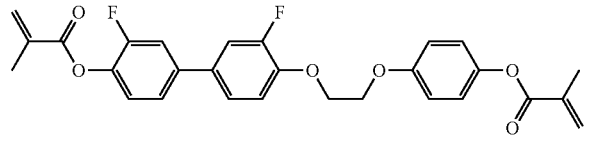
(Formula 3-5)

and,
wherein in Formula 1-1 and Formula 1-2, R is a C1 to C8 alkyl group, an alkenyl group, or an alkoxy group.

2. The liquid crystal composition of claim 1, wherein:
a content of the liquid crystal compound expressed by Formula 1-1 is 0.5 wt % to 3 wt % of the liquid crystal composition, and
a content of the liquid crystal compound expressed by Formula 1-2 is 0.5 wt % to 3 wt % of the liquid crystal composition.

3. The liquid crystal composition of claim 1, further comprising:
a liquid crystal compound expressed by Formula 1-3,
wherein a content of the liquid crystal compound expressed by Formula 1-3 is greater than 0 wt % and equal to or less than 10 wt % of the liquid crystal composition:

(Formula 1-3)

R—⬡—⬡—R', and
wherein R and R' are independently a C1 to C8 alkyl group, an alkenyl group, or an alkoxy group.

4. The liquid crystal composition of claim 1, wherein a content of at least one of the self-alignment compound expressed by Formula 2-1 and the self-alignment compound expressed by Formula 2-2 is 0.05 wt % to 3 wt % of the liquid crystal composition.

5. The liquid crystal composition of claim 1, wherein a content of at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 is 0.05 wt % to 3 wt % of the liquid crystal composition.

6. The liquid crystal composition of claim 1, wherein refractive anisotropy of the liquid crystal composition is 0.08 to 0.13, rotation viscosity is 70 to 150, and dielectric anisotropy is −2.8 to −5.5.

7. The liquid crystal composition of claim 3, wherein: the liquid crystal composition comprises both the self-alignment compound expressed by Formula 2-1 and the self-alignment compound expressed by Formula 2-2, and
an absolute value of average interaction energy between one of the liquid crystal compound expressed by Formula 1-1 and the liquid crystal compound expressed by Formula 1-2 and both the self-alignment compound expressed by Formula 2-1 and the self-alignment compound Formula 2-2 is greater than an absolute value of average interaction energy between the liquid crystal compound expressed by Formula 1-3 and both the self-alignment compound expressed by Formula 2-1 and the self-alignment compound expressed by Formula 2-2.

8. The liquid crystal composition of claim 1, further comprises at least one compound selected from the group consisting of a compound expressed by Formula 1-4, a compound expressed by Formula 1-5, a compound expressed by Formula 1-6, a compound expressed by Formula 1-7, a compound expressed by Formula 1-8:

(Formula 1-4)

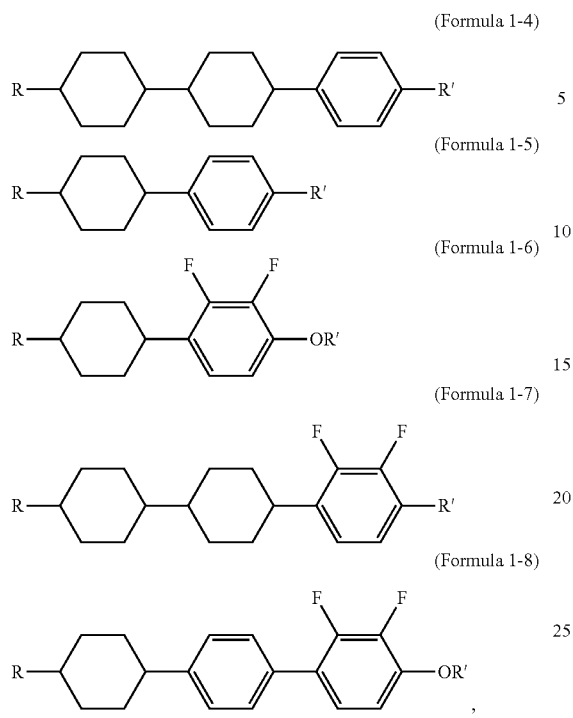

(Formula 1-5)

(Formula 1-6)

(Formula 1-7)

(Formula 1-8)

and
R and R' are independently a C1 to C8 alkyl group, an alkenyl group, or an alkoxy group.

9. A display device, comprising:
a first substrate;
a second substrate facing the first substrate and overlapping the first substrate; and
a liquid crystal layer disposed between the first substrate and the second substrate,
wherein the liquid crystal layer comprises a liquid crystal composition comprising:
  each of a liquid crystal compound expressed by Formula 1-1, a liquid crystal compound expressed by Formula 1-2, and a liquid crystal compound expressed by Formula 1-3,
  at least one compound selected from the group consisting of a self-alignment compound expressed by Formula 2-1 and a self-alignment compound expressed by Formula 2-2, and
  a liquid crystal composition comprising at least one compound selected from the group consisting of a reactive mesogen expressed by Formula 3-1, a reactive mesogen expressed by Formula 3-2, a reactive mesogen expressed by Formula 3-3, a reactive mesogen expressed by Formula 3-4, a reactive mesogen expressed by Formula 3-5,
  wherein an absolute value of average interaction energy between one of the self-alignment compound expressed by Formula 2-1 and the self-alignment compound expressed by Formula 2-2 and one of the liquid crystal compound expressed by Formula 1-1 and the liquid crystal compound expressed by Formula 1-2 is greater than an absolute value of average interaction energy between the liquid crystal compound expressed by Formula 1-3 and one of the self-alignment compound expressed by Formula 2-1 and the self-alignment compound expressed by Formula 2-2:

(Formula 1-1)

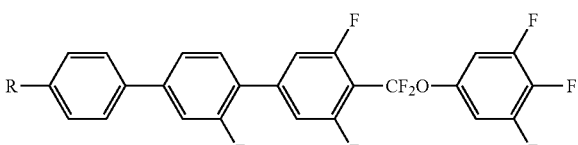

(Formula 1-2)

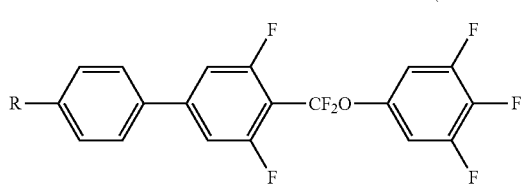

(Formula 1-3)

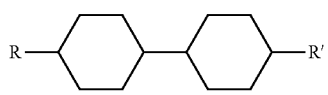

(Formula 2-1)

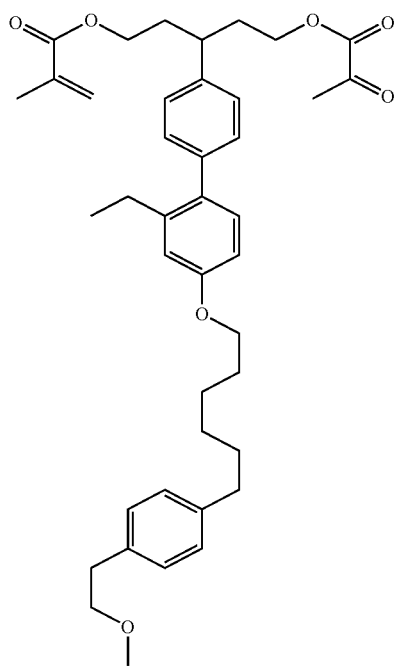

(Formula 2-2)

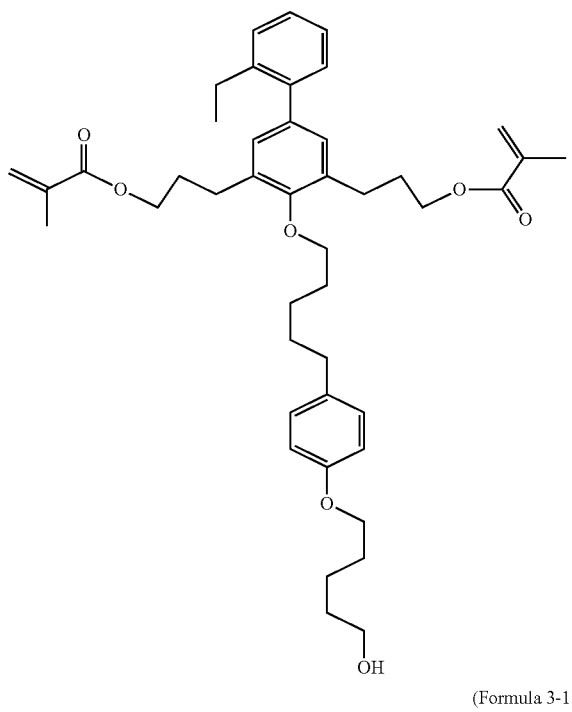

(Formula 3-1)

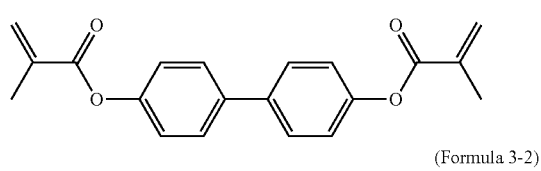

(Formula 3-2)

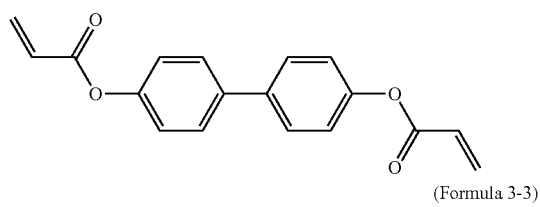

(Formula 3-3)

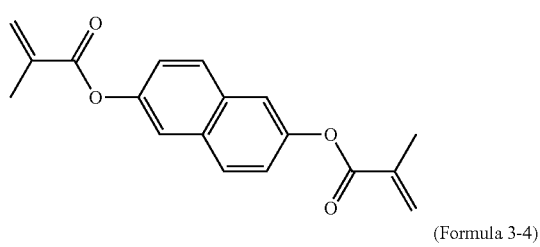

(Formula 3-4)

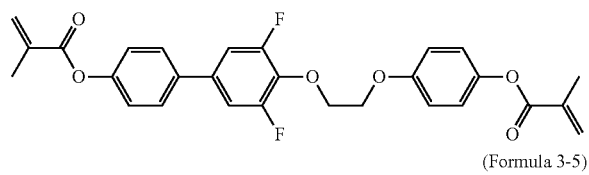

(Formula 3-5)

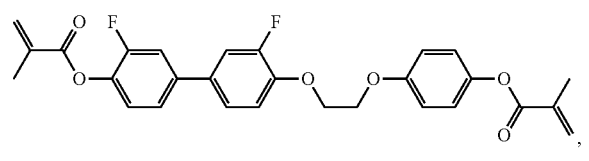

and wherein in Formula 1-1, Formula 1-2, and Formula 1-3, R and R' are independently a C1 to C8 alkyl group, an alkenyl group, or an alkoxy group.

10. The display device of claim 9, wherein:

a content of the liquid crystal compound expressed by Formula 1-1 is 0.5 wt % to 3 wt % of the liquid crystal composition, a content of the liquid crystal compound expressed by Formula 1-2 is 0.5 wt % to 3 wt % of the liquid crystal composition, and a content of the liquid crystal compound expressed by Formula 1-3 is greater than 0 wt % and equal to or less than 10 wt % of the liquid crystal composition.

11. The display device of claim 9, wherein a content of the at least one of the self-alignment compound expressed by Formula 2-1 and the self-alignment compound expressed by Formula 2-2 is 0.05 wt % to 3 wt % of the liquid crystal composition.

12. The display device of claim 11, wherein a content of at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 is 0.05 wt % to 3 wt % of the liquid crystal composition.

13. The display device of claim 12, wherein a content of at least one of the self-alignment compound expressed by Formula 2-1 and the self-alignment compound expressed by Formula 2-2 is greater than a content of at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5.

14. The display device of claim 9, wherein refractive anisotropy of the liquid crystal composition is 0.08 to 0.13, rotation viscosity is 70 to 150, and dielectric anisotropy is −2.8 to −5.5.

15. The display device of claim 9, wherein:

the liquid crystal composition further comprises at least one of a compound expressed by Formula 1-4, a compound expressed by Formula 1-5, a compound expressed by Formula 1-6, a compound expressed by Formula 1-7, and a compound expressed by Formula 1-8:

(Formula 1-4)

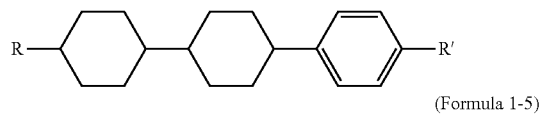

(Formula 1-5)

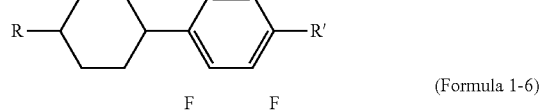

(Formula 1-6)

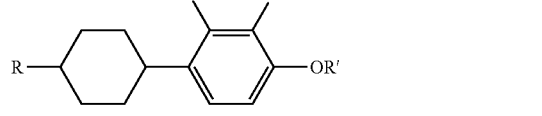

(Formula 1-7)

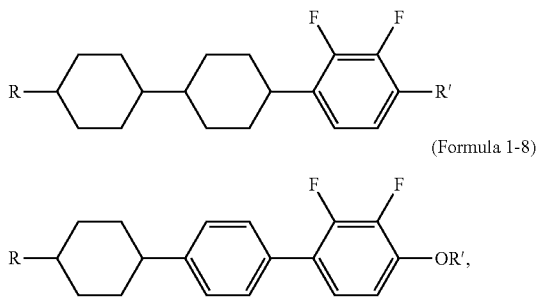

(Formula 1-8)

and
R and R' are independently a C1 to C8 alkyl group, an alkenyl group, or an alkoxy group.

16. The display device of claim 9, wherein
at least one of the self-alignment compound expressed by Formula 2-1 and the self-alignment compound expressed by Formula 2-2 is disposed between the first substrate and the liquid crystal layer and between the second substrate and the liquid crystal layer, and
at least one of the self-alignment compound expressed by Formula 2-1 and the self-alignment compound expressed by Formula 2-2 vertically aligns a plurality of liquid crystal molecules of the liquid crystal layer.

17. The display device of claim 9, wherein
at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 is disposed between the first substrate and the liquid crystal layer and between the second substrate and the liquid crystal layer, and
at least one of the reactive mesogen expressed by Formula 3-1, the reactive mesogen expressed by Formula 3-2, the reactive mesogen expressed by Formula 3-3, the reactive mesogen expressed by Formula 3-4, and the reactive mesogen expressed by Formula 3-5 arranges a plurality of liquid crystal molecules of the liquid crystal layer to be inclined with respect to a direction that is perpendicular to the first substrate.

18. The display device of claim 9, wherein the display device does not include an alignment layer disposed between the first substrate and the liquid crystal layer and between the second substrate and the liquid crystal layer.

* * * * *